United States Patent
Hong

(10) Patent No.: US 11,294,237 B2
(45) Date of Patent: Apr. 5, 2022

(54) FLEXIBLE TOUCH DISPLAY PANEL AND FLEXIBLE TOUCH DISPLAY APPARATUS

(71) Applicant: Xiamen Tianma Micro-Electronics Co., Ltd., Fujian (CN)

(72) Inventor: Jinlong Hong, Fujian (CN)

(73) Assignee: Xiamen Tianma Micro-Electronics Co., Ltd., Fujian (CN)

( * ) Notice: Subject to any disclaimer, the term of this patent is extended or adjusted under 35 U.S.C. 154(b) by 156 days.

(21) Appl. No.: 16/959,240

(22) PCT Filed: Aug. 28, 2019

(86) PCT No.: PCT/CN2019/103073
§ 371 (c)(1),
(2) Date: Jun. 30, 2020

(87) PCT Pub. No.: WO2020/258495
PCT Pub. Date: Dec. 30, 2020

(65) Prior Publication Data
US 2021/0405455 A1 Dec. 30, 2021

(30) Foreign Application Priority Data

Jun. 27, 2019 (CN) .......................... 201910569097.0

(51) Int. Cl.
*G02F 1/13357* (2006.01)
(52) U.S. Cl.
CPC .. *G02F 1/133608* (2013.01); *G02F 1/133603* (2013.01)
(58) Field of Classification Search
CPC ............................................... G02F 1/133608
See application file for complete search history.

(56) References Cited

U.S. PATENT DOCUMENTS

2016/0274413 A1    9/2016   Kang et al.

FOREIGN PATENT DOCUMENTS

| CN | 102705755 A | 10/2012 |
| CN | 103547109 A | 1/2014 |
| CN | 203605105 U | 5/2014 |

(Continued)

OTHER PUBLICATIONS

Chinese Office Action for application No. 201910569097.0; dated Apr. 22, 2020.

(Continued)

*Primary Examiner* — Vip Patel
(74) *Attorney, Agent, or Firm* — von Briesen & Roper, s.c.

(57) ABSTRACT

Disclosed are a method for preparing a curved surface backlight module, a curved surface backlight module and a display device. The method includes described below. An initial back panel is provided, where the initial back panel includes a first surface and a second surface which are opposite to each other, the first surface includes multiple first flat regions and multiple first convex curved regions, each of the multiple first convex curved regions is located between adjacent first flat regions, the second surface includes multiple second flat regions and multiple first concave curved regions. An initial lamp panel is provided. The initial back panel and the initial lamp panel are curved to form the curved surface backlight module, where a curving axis of the curved surface backlight module is parallel to curving axes of the multiple first convex curved regions and curving axes of the multiple first concave curved regions.

15 Claims, 7 Drawing Sheets

(56) References Cited

FOREIGN PATENT DOCUMENTS

| CN | 104977752 A | 10/2015 |
| KR | 1020120128123 A | 11/2012 |
| WO | WO 2016/098933 A1 | 6/2016 |
| WO | WO 2018/100699 A1 | 6/2018 |

OTHER PUBLICATIONS

International Search Report related to Application No. PCT/CN2019/103073, dated Mar. 27, 2020.

Provide an initial back panel, where the initial back panel includes a first surface and a second surface which are opposite to each other, the first surface includes multiple first flat regions and multiple first convex curved regions, each of the multiple first convex curved regions is located between adjacent first flat regions, the second surface includes multiple second flat regions and multiple first concave curved regions, each of the multiple first concave curved regions is located between adjacent second flat regions, the multiple first flat regions and the multiple second flat regions are arranged directly opposite to each other in one-to-one correspondence, the multiple first convex curved regions and the multiple first concave curved regions are arranged directly opposite to each other in one-to-one correspondence, the multiple first convex curved regions are convex away from the multiple first concave curved regions, and the multiple first concave curved regions are concave toward the multiple first convex curved regions ⟶ S110

Provide an initial lamp panel, where multiple light sources are welded on a front surface of the initial lamp panel through bonding pads ⟶ S120

Lay a back surface of the initial lamp panel on the first surface of the initial back panel, where the back surface of the initial lamp panel faces away from the front surface ⟶ S130

Curve the initial back panel and the initial lamp panel to form a curved surface backlight module ⟶ S140

FIG. 4

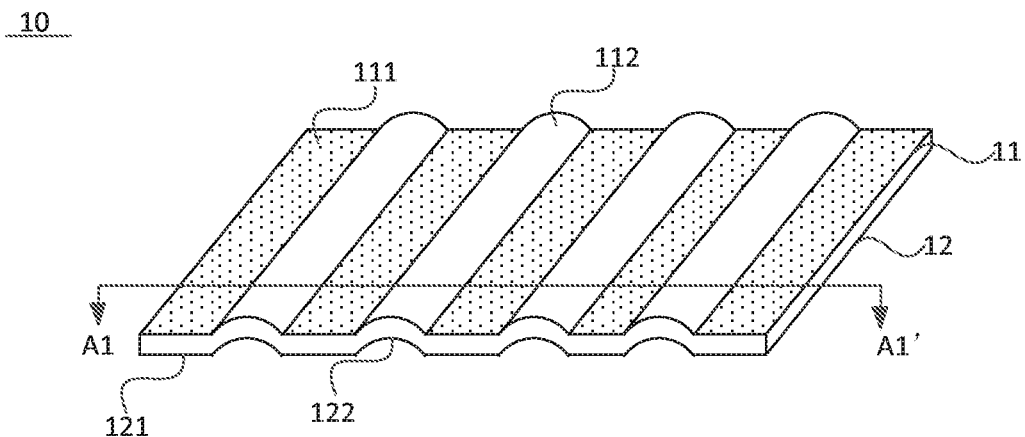

FIG. 5

FLEXIBLE TOUCH DISPLAY PANEL AND FLEXIBLE TOUCH DISPLAY APPARATUS

The present application is a National Stage Application, filed under 35 U.S.C. 371, of International Patent Application No. PCT/CN2019/103073 filed on Aug. 28, 2019, which claims priority to a Chinese patent application No. 201910569097.0 filed on Jun. 27, 2019, the contents of both of which are incorporated herein by reference in their entireties.

TECHNICAL FIELD

Embodiments of the present application relate to the technical field of curved surface display and, for example, to a method for preparing a curved surface backlight module, a curved surface backlight module, and a display device.

BACKGROUND

A curved surface display device refers to a display device with a screen having a certain curvature. This curved surface display device has the advantages of better contrast and wider view angle, and has broad market prospects in the fields of automobiles, wearable devices, televisions, mobile phone communications and the like.

For a liquid crystal curved surface display device, not only a liquid crystal display panel has a certain curvature, but also a backlight module is adaptively curved when assembled with the liquid crystal display panel. In the related art, the backlight module generally includes a back panel, a lamp panel and a light source. Generally, the light source is firstly welded on the lamp panel through bonding pads, and then the lamp panel is laid flat on the back panel which is flat, and then the back panel is curved and fixed, so that the lamp panel has a certain curvature.

However, when the lamp panel is in a naturally flattened state, the horizontal distance between bonding pads of two adjacent light sources may be recorded as S1; and when the lamp panel is curved along with the back panel, the horizontal distance between the bonding pads of the two adjacent light sources may be recorded as S1. Obviously, due to the curved lamp panel, S2 will be less than S1, that is, the distance between the bonding pads of the two adjacent light sources is reduced after the lamp panel is curved along with the back panel, and thus the risk of short-circuiting between the two adjacent light sources is increased. Moreover, when the lamp panel is curved along with the back panel, the bonding pads of the light sources are squeezed by the lamp panel and are prone to breakage or pseudo soldering, and thus dead lamp occurs in the backlight module.

SUMMARY

The present application provides a method for preparing a curved surface backlight module, a curved surface backlight module, and a display device, so as to avoid lead lamp and short circuiting of a light source of the curved surface backlight module.

In a first aspect, an embodiment of the present application provides a method for preparing a curved surface backlight module. The method includes:

an initial back panel is provided, where the initial back panel includes a first surface and a second surface which are opposite to each other, the first surface includes multiple first flat regions and multiple first convex curved regions, each of the multiple first convex curved regions is located between adjacent first flat regions, the second surface includes multiple second flat regions and multiple first concave curved regions, each of the multiple first concave curved regions is located between adjacent second flat regions, the multiple first flat regions and the multiple second flat regions are arranged directly opposite to each other in one-to-one correspondence, the multiple first convex curved regions and the multiple first concave curved regions are arranged directly opposite to each other in one-to-one correspondence, the multiple first convex curved regions are convex away from the multiple first concave curved regions, and the multiple first concave curved regions are concave toward the multiple first convex curved regions;

an initial lamp panel is provided, where multiple light sources are welded on a front surface of the initial lamp panel through bonding pads;

a back surface of the initial lamp panel is laid on the first surface of the initial back panel, where the back surface of the initial lamp panel faces away from the front surface, and the multiple light sources are located at positions of the initial lamp panel corresponding to the multiple first flat regions; and the initial back panel and the initial lamp panel are curved to form the curved surface backlight module, where a curving axis of the curved surface backlight module is parallel to curving axes of the multiple first convex curved regions and curving axes of the multiple first concave curved regions.

In a second aspect, an embodiment of the present application further provides a curved surface backlight module. The curved surface backlight module includes a back panel and a lamp panel, where the back panel is formed by curving an initial back panel, and the initial back panel includes a first surface and a second surface which are opposite to each other, the first surface includes multiple first flat regions and multiple first convex curved regions, each of the multiple first convex curved regions is located between adjacent first flat regions, the second surface includes multiple second flat regions and multiple first concave curved regions, each of the multiple first concave curved regions is located between adjacent second flat regions, where the multiple first flat regions and the multiple second flat regions are arranged directly opposite to each other in one-to-one correspondence, the multiple first convex curved regions and the multiple first concave curved regions are arranged directly opposite to each other in one-to-one correspondence, the multiple first convex curved regions are convex away from the multiple first concave curved regions, and the multiple first concave curved regions are concave toward the multiple first convex curved regions, where the lamp panel is formed by curving an initial lamp panel, and multiple light sources on the initial lamp panel are welded on a front surface of the initial lamp panel through bonding pads, and where a back surface of the initial lamp panel is laid on the first surface of the initial back panel, the back surface of the lamp panel faces away from the front surface, the multiple light sources are located at positions of the initial lamp panel corresponding to the multiple first flat regions, and a curving axis of the curved surface backlight module is parallel to curving axes of the multiple first convex curved regions and curving axes of the multiple first concave curved regions.

In a third aspect, an embodiment of the present application further provides a curved surface backlight module. The curved surface backlight module includes a back panel and a lamp panel, where the back panel includes a third surface and a fourth surface which are opposite to each other, the third surface includes multiple first arc regions and multiple second convex curved regions, each of the multiple second convex curved regions is located between adjacent first arc regions, the fourth surface includes multiple second arc regions and multiple second concave curved regions, each of the multiple second concave curved regions is located between adjacent second arc regions, where the multiple first arc regions and the multiple second arc regions are arranged directly opposite to each other in one-to-one correspondence, the multiple second convex curved regions and the multiple second concave curved regions are arranged directly opposite to each other in one-to-one correspondence, the multiple second convex curved regions are convex away from the multiple second concave curved regions, and the multiple second concave curved regions are concave toward the multiple second convex curved regions, where a back surface of the lamp panel is attached to the third surface of the back panel, multiple light sources on the lamp panel are welded on a front surface of the lamp panel through bonding pads, the back surface of the lamp panel faces away from the front surface, the multiple light sources are located at positions of the initial lamp panel corresponding to the multiple first arc regions, and where a curving axis of the curved surface backlight module is parallel to curving axes of the multiple second convex curved regions and curving axes of the multiple second concave curved regions.

BRIEF DESCRIPTION OF DRAWINGS

FIG. 4 is a flowchart of a method for preparing a curved surface backlight module in accordance with an embodiment of the present application;

FIG. 5 is a schematic structural diagram of an initial back panel in accordance with an embodiment of the present application;

DETAILED DESCRIPTION

Figure 1:
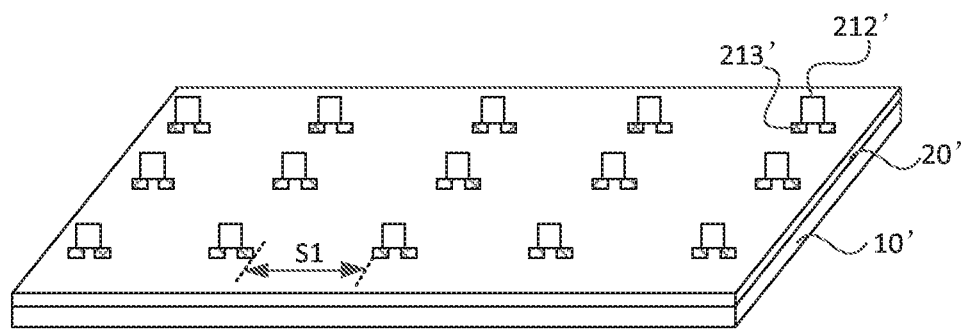
FIG. 1 is a schematic structural diagram of an initial back panel and an initial lamp panel in accordance with the related art.

It should be noted that, for ease of description, only part, but not all, of the structure related to the present application is shown in the drawings.

Figure 2:
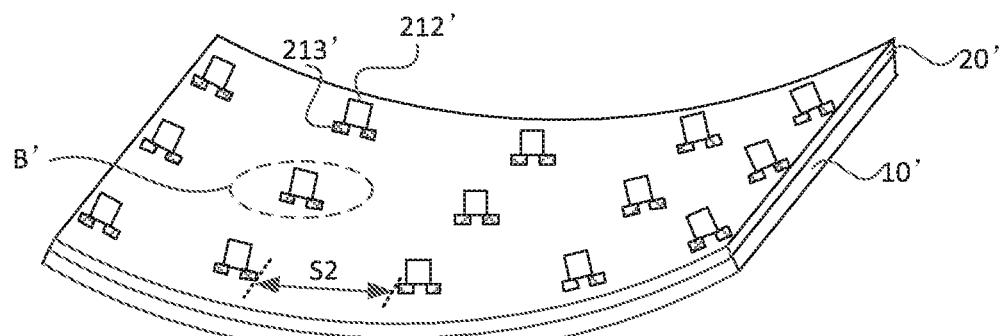
FIG. 2 is a schematic structural diagram of a curved surface backlight module in accordance with the related art.
Figure 3:
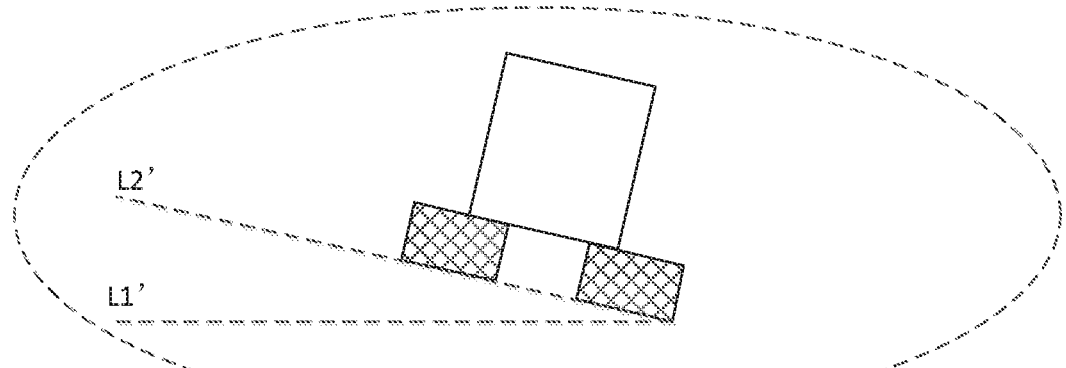
FIG. 3 is an enlarged schematic view at B' in FIG. 2.

FIG. 1 is a schematic structural diagram of an initial back panel and an initial lamp panel in accordance with the related art. FIG. 2 is a schematic structural diagram of a curved surface backlight module in accordance with the related art. FIG. 3 is an enlarged schematic view at B' in FIG. 2. Referring to FIGS. 1 and 2, a method for preparing a curved surface backlight module in the related art includes: firstly, an initial lamp panel 20' is provided, the initial lamp panel 20' includes a front surface and a back surface which are opposite to each other, and multiple light sources 212' are welded on the front surface of the initial lamp panel 20' through bonding pads 213'. Then, an initial back panel 10' is provided. The initial back panel 10' includes a first flat surface and a second flat surface which are opposite to each other. Then, the back surface of the initial lamp panel 20' is laid on the first flat surface of the initial back panel 10'. Finally, the initial back panel 10' and the initial lamp panel 20' are curved to form the curved surface backlight module, as shown in FIG. 2. However, the curved surface backlight module obtained by the above-mentioned manner is prone to dead lamp and short circuit. Continuing to refer to FIGS. 1 and 2, before the initial lamp panel 20' is curved, a distance between two adjacent light sources 212' is S1, and after the initial lamp panel 20' is curved, a distance between the two adjacent light sources 212' is reduced to S1, and since the distance between the two adjacent light sources 212' is reduced, so that short-circuiting is easily caused between the light sources 212'. Moreover, after the initial lamp panel 20' is curved along with the initial back panel 10', two bonding pads 213' of the light source 212' are not located on a same horizontal plane, as shown in FIG. 3, a connecting line L2' of the two bonding pads 213' deviates from a horizontal line L1' by a certain angle, the horizontal line L1' is parallel to a plane in which the initial lamp panel 20' is located; in the two bonding pads 213' of the light source 212', the bonding pad 213' close to the interior of the curved initial back panel 10' is squeezed and thus is prone to breakage or pseudo soldering, thereby causing dead lamp in the backlight module.

In view of this, an embodiment of the present application provides a method for preparing a curved surface backlight module. FIG. 4 is a flowchart of a method for preparing a curved surface backlight module in accordance with an embodiment of the present application. Referring to FIG. 4, the method includes S110 to S140.

In S110, an initial back panel is provided. The initial back panel includes a first surface and a second surface which are opposite to each other. The first surface includes multiple first flat regions and multiple first convex curved regions, each of the multiple first convex curved regions is located between adjacent first flat regions; the second surface includes multiple second flat regions and multiple first concave curved regions, each of the multiple first concave curved regions is located between adjacent second flat regions, the multiple first flat regions and the multiple second flat regions are arranged directly opposite to each other in one-to-one correspondence, the multiple first convex curved regions and the multiple first concave curved regions are arranged directly opposite to each other in one-to-one correspondence, the multiple first convex curved regions are convex away from the multiple first concave curved regions, and the multiple first concave curved regions are concave toward the multiple first convex curved regions.

Figure 6:
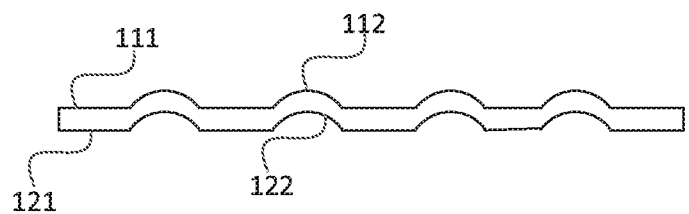
FIG. 6 is a cross-sectional view taken in an A1-A1' direction of FIG. 5.

FIG. 5 is a schematic structural diagram of an initial back panel in accordance with an embodiment of the present application. FIG. 6 is a cross-sectional view taken in an A1-A1' direction of FIG. 5. Referring to FIGS. 5 and 6, the initial back panel 10 includes a first surface 11 and a second surface 12 which are opposite to each other. The first surface 11 includes multiple first flat regions 111 and multiple first convex curved regions 112, each of the multiple first convex curved regions 112 is located between adjacent first flat regions 111. The second surface 12 includes multiple second flat regions 121 and multiple first concave curved regions 122, and each of the multiple first concave curved regions 122 is located between adjacent second flat regions 121, the multiple first flat regions 111 and the multiple second flat regions 121 are arranged directly opposite to each other in one-to-one correspondence, the multiple first convex curved regions 112 and the multiple first concave curved regions 122 are arranged directly opposite to each other in one-to-one correspondence, the multiple first convex curved regions 112 are convex away from the multiple first concave curved regions 122, the multiple first concave curved regions 122 are concave toward the multiple first convex curved regions 112.

In an embodiment, areas of the multiple first flat regions 111 may be the same or different. A boundary contour line of each of the multiple first convex curved regions 112 may be parallel or not parallel to a boundary contour line of a respective one of the multiple first concave curved regions 122. The boundary contour line of each of the multiple first convex curved regions 112 described here refers to a portion, directly opposite to the multiple first convex curved regions 112, in a side line surrounding the first surface, and the boundary contour line of each of the multiple first concave curved regions 122 is similar, and is not to be detailed again. A curving axis of each of the multiple first convex curved regions 112 is parallel to a curving axis of a respective one of the multiple first concave curved regions 122, and a vertical projection of the curving axis of each of the multiple first convex curved regions 112 on the first concave curved region 122 may coincide with the curving axis of the first concave curved region 122 or may not coincide with the curving axis of the first concave curved region 122, and those skilled in the art may set according to an actual condition. The curving axis of each of the multiple first convex curved regions 112 described here refers to a straight line formed by connecting highest convex points on the first convex curved region 112, and the curving axis of each of the multiple first concave curved regions 122 refers to a straight line formed by connecting lowest concave points on the first concave curved region 122.

In an embodiment, the initial back panel 10 may be integrally formed by mold casting, or the initial back panel 10 may be formed by obtaining a prototype back panel having a flat surface and then curving the prototype back panel at multiple regions. The regions where the prototype back panel is curved correspond to the first convex curved regions 112 and the first concave curved regions 122, and regions where the prototype back panel is not curved correspond to the first flat regions 111 and the second flat regions 121. In an embodiment, a material of the initial back panel 10 may be metal, such as iron or aluminum, or plastic.

In S120, an initial lamp panel is provided, where multiple light sources are welded on a front surface of the initial lamp panel through bonding pads.

In S130, a back surface of the initial lamp panel is laid on the first surface of the initial back panel; the back surface of the initial lamp panel faces away from the front surface.

Figure 7:
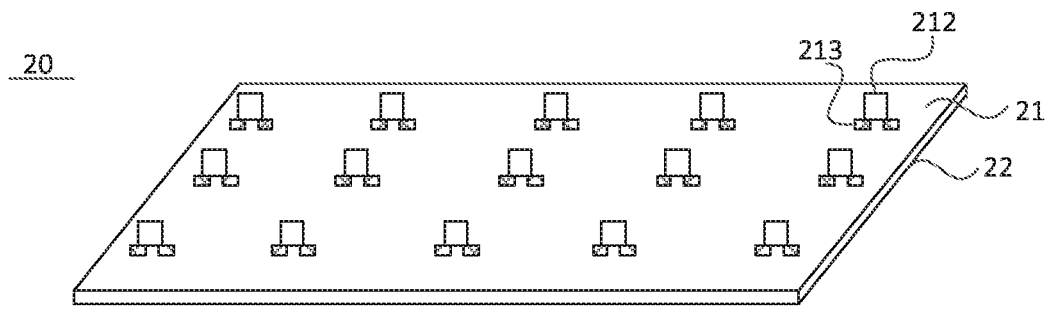
FIG. 7 is a schematic structural diagram of an initial lamp panel in accordance with an embodiment of the present application.
Figure 8:
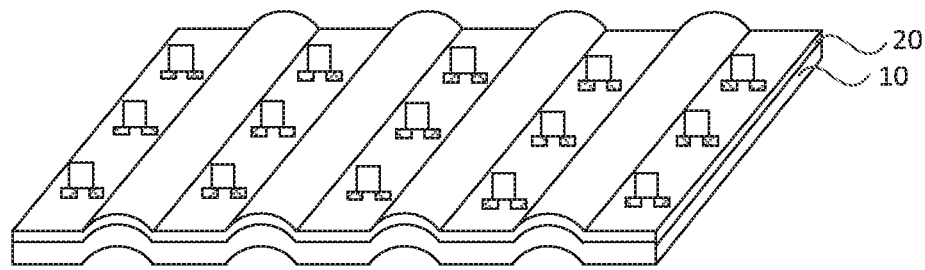
FIG. 8 is a schematic structural view of an initial lamp panel after being laid on an initial back panel in accordance with an embodiment of the present application.

FIG. 7 is a schematic structural diagram of an initial lamp panel in accordance with an embodiment of the present application. FIG. 8 is a schematic structural view of an initial lamp panel after being laid on an initial back panel in accordance with an embodiment of the present application. Referring to FIG. 7, this initial lamp panel 20 includes a front surface 21 and a back surface 22 which are opposite to each other, and multiple light sources 212 are welded on the front surface 21 of the initial lamp panel 20 through bonding pads 213. In an embodiment, a material of the initial lamp panel 20 may be a flexible base material, so that when the back surface 22 of the initial lamp panel 20 is laid on the first surface 11 of the initial back panel 10, the back surface 22 of the initial lamp panel 20 may be closely attached to the first surface 11 of the initial back panel 10. The light sources 212 may be light emitting diodes.

When the back surface 22 of the initial lamp panel 20 is laid on the first surface 11 of the initial back panel 10, a region of the initial lamp panel 20 directly facing the multiple first flat regions 111 of the initial back panel 10 is provided with the multiple light sources 212, and a region of the initial lamp panel 20 directly facing the multiple first convex curved regions 121 of the initial back panel 10 is not provided with the multiple light sources 212, as shown in FIG. 8.

In S140, the initial back panel and the initial lamp panel are curved to form a curved surface backlight module.

Figure 9:
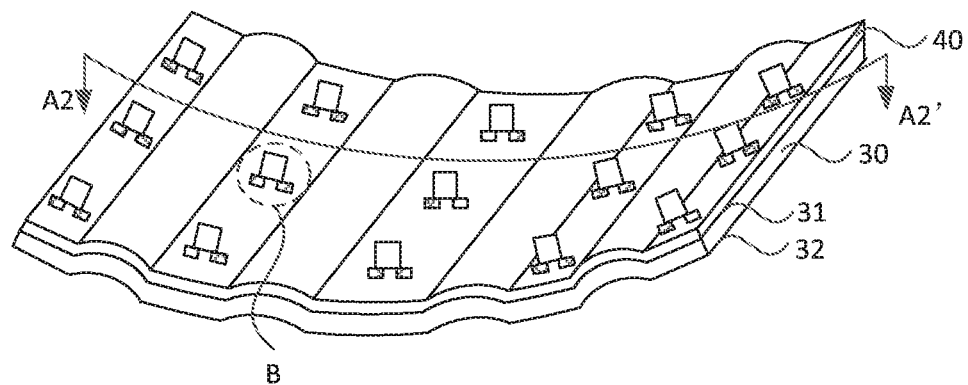
FIG. 9 is a schematic structural diagram of a curved surface backlight module in accordance with an embodiment of the present application.
Figure 10:
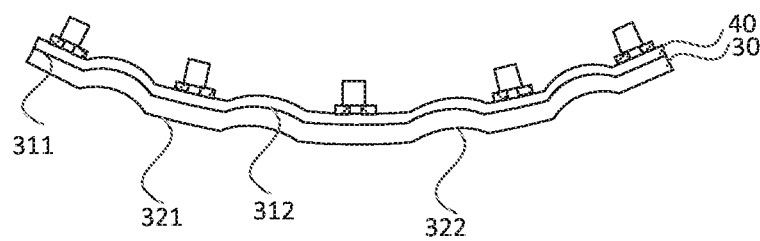
FIG. 10 is a cross-sectional view taken in an A2-A2' direction of FIG. 9.

FIG. 9 is a schematic structural diagram of a curved surface backlight module in accordance with an embodiment of the present application. FIG. 10 is a cross-sectional view taken in an A2-A2' direction of FIG. 9. In an embodiment, the curved surface backlight module is formed by squeezing the initial back panel 10 and the initial lamp panel 20 toward a direction of squeezing the first surface 11 of the initial back panel 10 and stretching the second surface 12 of the initial back panel 20 toward a direction of making a curving axis of the curved surface backlight module formed subsequently parallel to curving axes of the multiple first convex curved regions 112, as shown in FIG. 9. Referring to FIGS. 9 and 10, the curved surface backlight module includes a back panel 30 and a lamp panel 40. The back panel 30 is formed by curving the initial back panel 10, and the lamp panel 40 is formed by curving the initial lamp panel 20. The back panel 30 includes a third surface 31 and a fourth surface 32 which are opposite to each other. The lamp panel 40 includes an upper surface and a lower surface which are opposite to each other. The upper surface of the lamp panel 40 is provided with a light source. The lower surface of the lamp panel 40 is attached to the third surface 31 of the back panel 30. The third surface 31 includes multiple first arc regions 311 and multiple second convex curved regions 312, each of the multiple second convex curved regions 312 is located between adjacent first arc regions 311, and the fourth surface 32 includes multiple second arc regions 321 and multiple second concave curved regions 322, each of the multiple second concave curved regions 322 is located between adjacent second arc regions 321. The multiple first arc regions 311 are formed by curving the multiple first flat regions 111; the multiple second convex regions 312 are formed by stretching the multiple first convex curved regions 112, and the multiple second arc regions 321 are formed by curving the multiple second flat regions 121, and the multiple second concave curved regions 322 are formed by stretching the multiple first concave curved regions 122. The multiple first arc regions 311 are located on a same arc cylindrical surface, and the curving axis of the curved surface backlight module refers to a central axis of this arc cylindrical surface.

Figure 11:
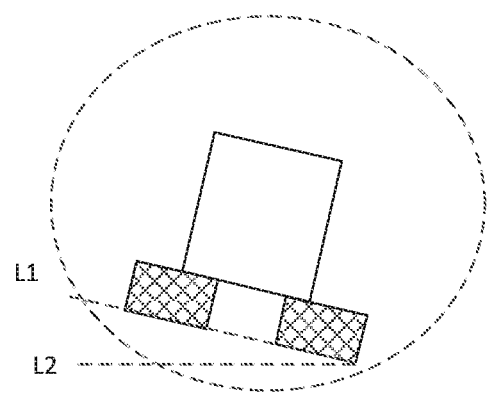
FIG. 11 is an enlarged schematic view at B in FIG. 9.

FIG. 11 is an enlarged schematic view at B in FIG. 9. Referring to FIGS. 10 and 11, in a process of curving the initial back panel and the initial lamp panel to form the curved surface backlight module, the multiple first convex curved regions and the multiple first concave curved regions are stretched, a "curving stacking" degree of the multiple first convex curved regions and the multiple first concave curved regions is reduced, and a distance between two adjacent light sources on two sides of the first convex curved region and the first concave curved region may be relatively increased, so that a degree of reduction of the distance between the two adjacent light sources caused by curving of the initial back panel is reduced, and short-circuiting of the two adjacent light sources is avoided. Moreover, the multiple first convex curved regions and the multiple first concave curved regions are stretched, the curving degree of the multiple first flat regions and the multiple second flat regions may be relatively reduced, and the curvature of the multiple first arc regions 311 and the multiple second arc regions 321 may be relatively reduced. Namely, an inclination degree of a straight line L1 where two bonding pads of the light source are located relative to a horizontal line L2 may be reduced; the horizontal line L2 is parallel to a plane where the multiple first flat regions are located, so that pressure borne by the bonding pads, close to the interior of the back panel, of the light source is alleviated, and thus the breakage or pseudo soldering of the bonding pads is avoided.

In the method for preparing the curved surface backlight module in accordance with embodiments of the present application, the first surface of the initial back panel includes multiple first convex curved regions, and the second surface of the initial back panel includes multiple first concave curved regions, and the multiple first convex curved regions and the multiple first concave curved regions are arranged directly opposite to each other in one-to-one correspondence, so that in the process of curving the initial back panel and the initial lamp panel to form the curved surface backlight module, the multiple first convex curved regions and the multiple first concave curved regions are stretched, and thus an inclination degree of the straight line where the two bonding pads of the light source are located relative to a horizontal direction is reduced, and further the pressure borne by the bonding pads is alleviated, and the breakage or pseudo soldering of the bonding pads is avoided, the dead lamp of the curved surface backlight module is solved. Meanwhile, the multiple first convex curved regions and the multiple first concave curved regions are stretched, the distance of the two adjacent light sources on the two sides of the first convex curved region in the horizontal direction may be increased compared with the related art, the adjacent light sources are prone to be short circuited is solved, and the effect of avoiding the dead lamp or short-circuiting of light sources of the curved surface backlight module is achieved.

There are various specific arrangements of the initial lamp panel and the initial back panel, and an exemplary description is carried out on a condition that the initial lamp panel and the initial back panel are curved to form the curved surface backlight module.

Figure 12:
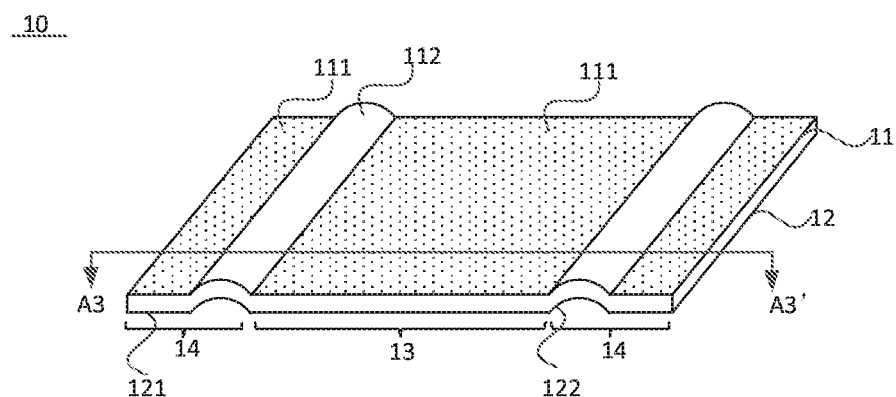
FIG. 12 is a schematic structural diagram of another initial back panel in accordance with an embodiment of the present application.
Figure 13:
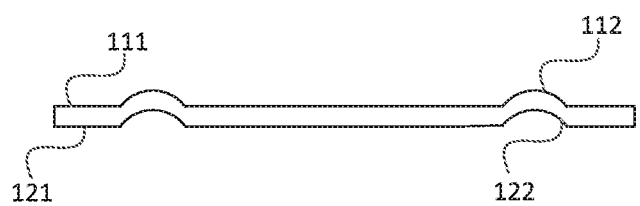
FIG. 13 is a cross-sectional view of taken in an A3-A3' direction of FIG. 12.

FIG. 12 is a schematic structural diagram of another initial back panel in accordance with an embodiment of the present application. FIG. 13 is a cross-sectional view taken in an A3-A3' direction of FIG. 12. Referring to FIGS. 12 and 13, the initial back panel 10 includes a central region 13 and edge regions 14 located on two sides of the central region 13. The initial back panel 10 further includes a first surface 11 and a second surface 12 which are opposite to each other, the first surface 11 includes multiple first flat regions 111 and multiple first convex curved regions 112, each of the multiple first convex curved regions 112 is located between adjacent first flat regions 111, and the second surface 12 includes multiple second flat regions 121 and multiple first concave curved regions 122, each of the multiple first concave curved regions 122 is located between adjacent second flat regions 121. The multiple first flat regions 111 and the multiple second flat regions 121 are arranged directly opposite to each other in one-to-one correspondence, the multiple first convex curved regions 112 and the multiple first concave curved regions 122 are arranged directly opposite to each other in one-to-one correspondence, and the multiple first convex curved regions 112 are convex away from the multiple first concave curved regions 122, and the multiple first concave curved regions 122 recesses the initial back panel toward the multiple first convex curved regions 112. In an embodiment, the multiple first convex curved regions 112 and the multiple first concave curved regions 122 are located in the edge regions. In an embodiment, a boundary contour line of each of the multiple first convex curved regions 112 is parallel to a boundary contour line of a respective one of the multiple first concave curved regions 122.

Figure 14:
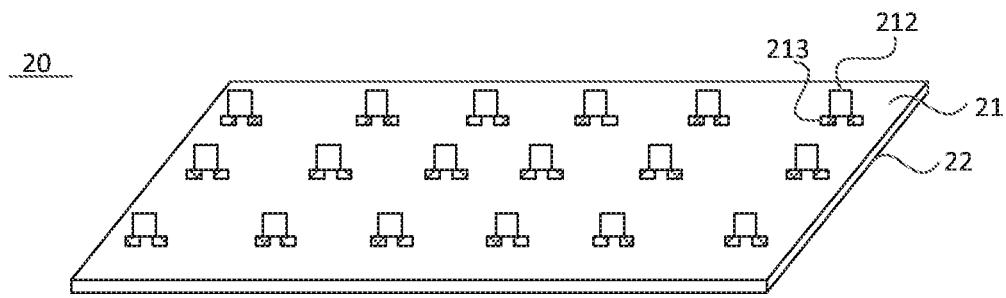
FIG. 14 is a schematic structural diagram of another initial lamp panel in accordance with an embodiment of the present application.
Figure 15:
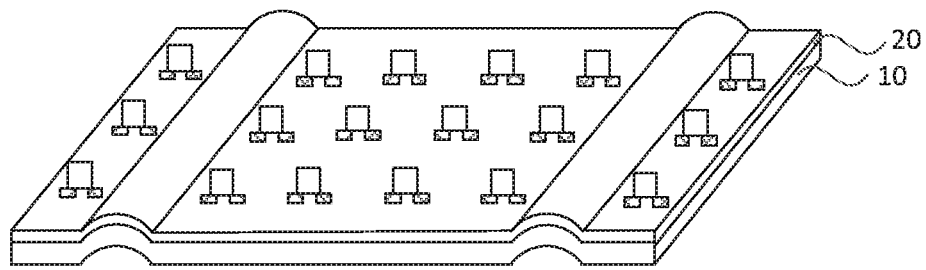
FIG. 15 is a schematic structural view of another initial lamp panel after being laid on an initial back panel in accordance with an embodiment of the present application.

FIG. 14 is a schematic structural diagram of another initial lamp panel in accordance with an embodiment of the present application. FIG. 15 is a schematic structural view of another initial lamp panel after being laid on an initial back panel in accordance with an embodiment of the present application. Referring to FIGS. 14 and 15, after laying the back surface 21 of the initial lamp panel 20 shown in FIG.

14 on the first surface 11 of the initial back panel 10 shown in FIG. 12, as shown in FIG. 15, a region of the initial lamp panel 20 directly opposite to the multiple first flat regions 111 of the initial back panel 10 is provided with light sources 212, and a region of the initial lamp panel 20 directly opposite to the multiple first convex curved regions 112 of the initial back panel 10 is not provided with light sources 212.

Figure 16:
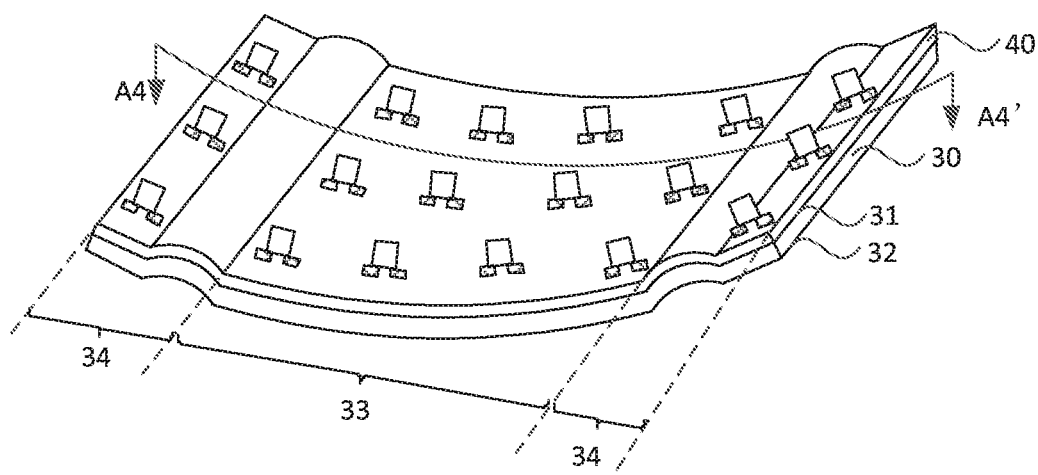
FIG. 16 is a schematic structural diagram of another curved surface backlight module in accordance with an embodiment of the present application.
Figure 17:
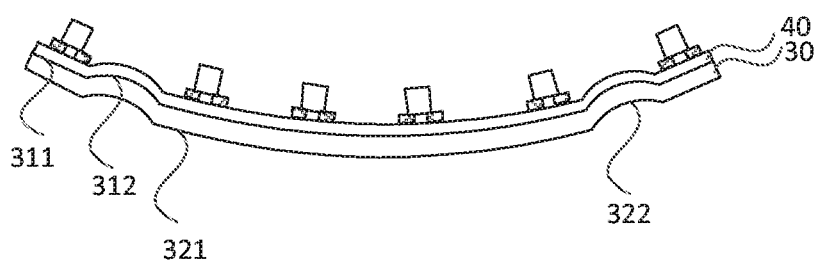
FIG. 17 is a cross-sectional view taken in an A4-A4' direction of FIG. 16.

FIG. 16 is a schematic structural diagram of another curved surface backlight module in accordance with an embodiment of the present application. FIG. 17 is a cross-sectional view taken in an A4-A4' direction of FIG. 16. The initial lamp panel and the initial back panel shown in FIG. 15 are curved to form a curved surface backlight module, as shown in FIG. 16. It will be appreciated that, when the initial back panel 10 is curved, the deformation of the central region 13 of the initial back panel 10 is small, and the deformation of the edge regions 14 is large, and thus among the light sources 212 of the curved surface backlight module formed by curving, a pressure exerted on the bonding pads 213 of the light sources 212 located in the central region 13 is small, and a pressure exerted on the bonding pads 213 of the light sources 212 located in the edge region 14 is large. The bonding pads 213 of the light sources 212 located in the central region 13 are relatively less susceptible to breakage and pseudo soldering, and the bonding pads 213 of the light sources 212 located in the edge region 14 are relatively more susceptible to breakage and pseudo soldering, so that the multiple first convex curved regions 112 and the multiple first concave curved regions 122 may be only provided in the edge regions 14.

It should be noted that, according to the above arrangement manner, the multiple first convex curved regions 112 and the multiple first concave curved regions 122 are only provided in the edge regions 14 of the initial back panel 10, so that dead lamp or short-circuiting of the light sources 212 of the curved surface backlight module may be partly avoided, and a proportion of the multiple first flat regions 111 on the first surface 11 may also be ensured to be large enough, that is, a large enough space is reserved for the provision of the light sourced 212, and it may be ensured that the luminance of the curved surface backlight module is large enough.

Figure 18:
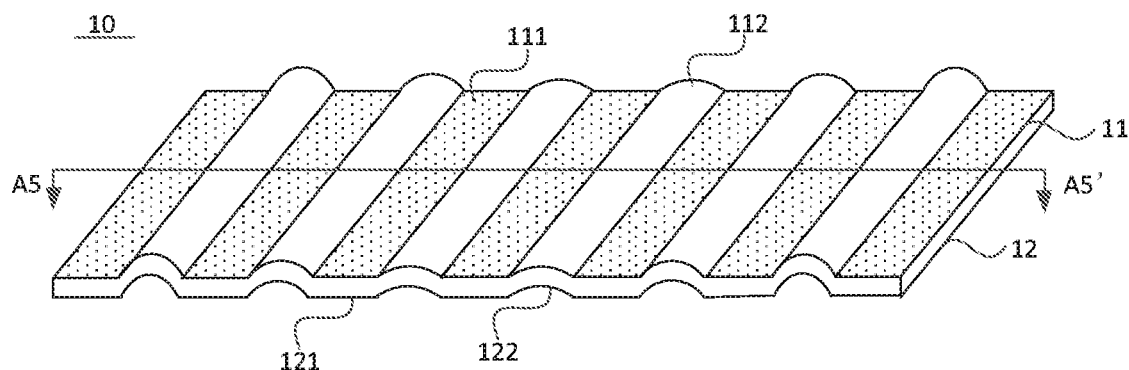
FIG. 18 is a schematic structural diagram of still another initial back panel in accordance with an embodiment of the present application.
Figure 19:
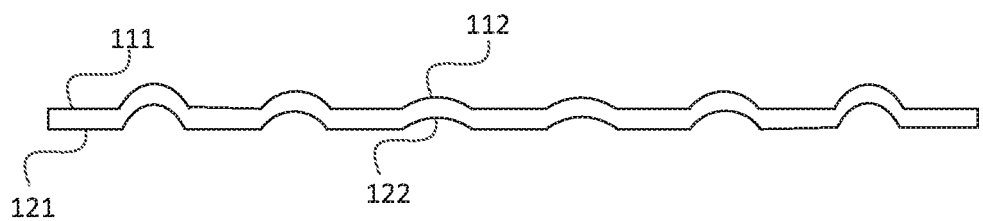
FIG. 19 is a cross-sectional view taken in an A5-A5' direction of FIG. 18.

FIG. 18 is a schematic structural diagram of still another initial back panel in accordance with an embodiment of the present application. FIG. 19 is a cross-sectional view taken in an A5-A5' direction of FIG. 18. Referring to FIGS. 18 and 19, the initial back panel 10 includes a central region 13 and edge regions 14 located on two sides of the central region 13. The initial back panel 10 further includes a first surface 11 and a second surface 12 which are opposite to each other. The first surface 11 includes multiple first flat regions 111 and multiple first convex curved regions 112, each of the multiple first convex curved regions 112 is located between adjacent first flat regions 111, and the second surface 12 includes multiple second flat regions 121 and multiple first concave curved regions 122, each of the multiple first concave curved regions 122 is located between adjacent second flat regions 121. The multiple first flat regions 111 and the multiple second flat regions 121 are arranged directly opposite to each other in one-to-one correspondence, and the multiple first convex curved regions 112 and the multiple first concave curved regions 122 are arranged directly opposite to each other in one-to-one correspondence, and the multiple first convex curved regions 112 are convex away from the multiple first concave curved regions 121, and the multiple first concave curved regions 122 recesses the initial back panel toward the multiple first convex curved regions 112. In an embodiment, the multiple first convex curved regions 112 and the multiple first concave curved regions 121 are located in the edge regions. In an embodiment, a boundary contour line of each of the multiple first convex curved regions 112 is parallel to a boundary contour line of respective one of the multiple first concave curved regions 122. In an embodiment, a perpendicular distance from a highest convex position of the first convex curved region 112 to first flat region 111 gradually increases in a direction from a center of the first surface 11 of the initial back panel 10 to an edge of the first surface 11 of the initial back panel 10.

Figure 20:
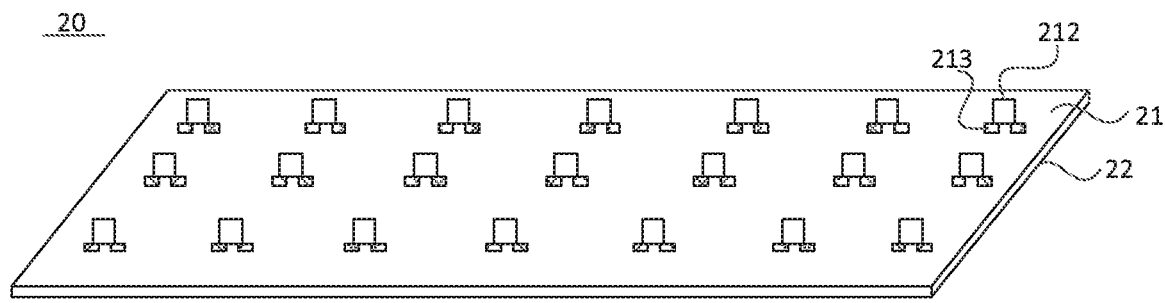
FIG. 20 is a schematic structural diagram of still another initial lamp panel in accordance with an embodiment of the present application.
Figure 21:
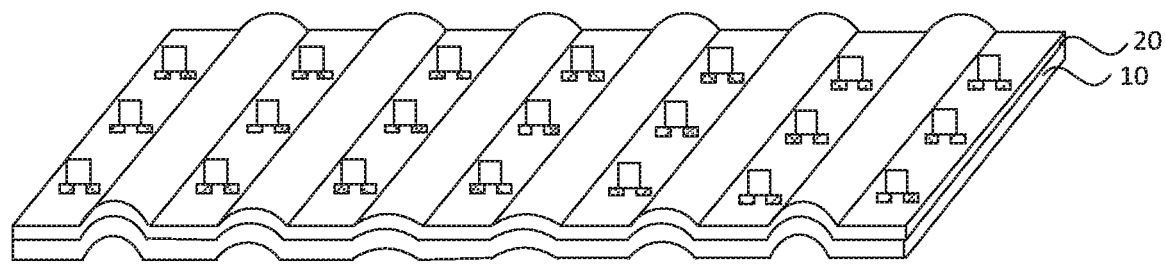
FIG. 21 is a schematic structural diagram of still another initial lamp panel after being laid on an initial back panel in accordance with an embodiment of the present application.

FIG. 20 is a schematic structural diagram of still another initial lamp panel in accordance with an embodiment of the present application. FIG. 21 is a schematic structural diagram of still another initial lamp panel after being laid on an initial back panel in accordance with an embodiment of the present application. Referring to FIGS. 20 and 21, after laying the back surface 22 of the initial lamp panel 20 shown in FIG. 20 on the first surface 11 of the initial back panel 10 shown in FIG. 18, as shown in FIG. 21, a region of the initial lamp panel 20 directly opposite to the multiple first flat regions 111 of the initial back panel 10 is provided with light sources 212, and a region of the initial lamp panel 20 directly opposite to the multiple first convex curved regions 112 of the initial back panel 10 is not provided with light sources 212.

Figure 22:
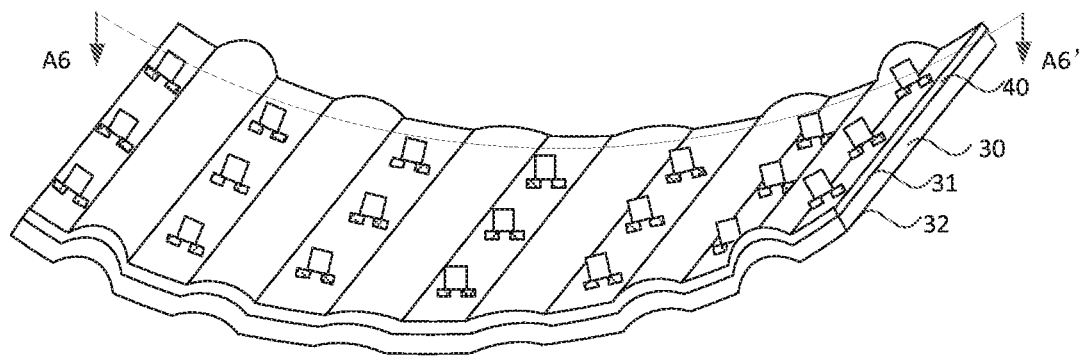
FIG. 22 is a schematic structural diagram of still another curved surface backlight module in accordance with an embodiment of the present application.
Figure 23:
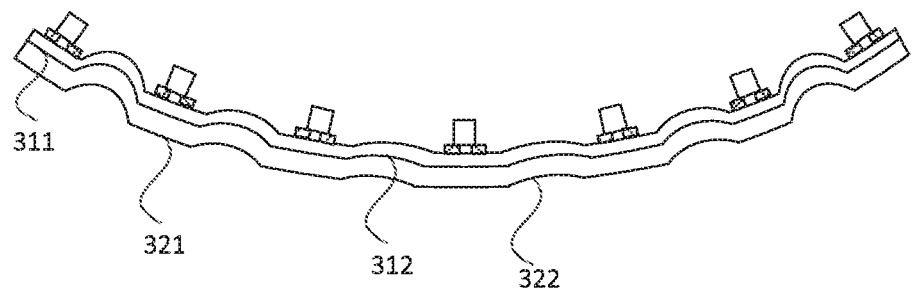
FIG. 23 is a cross-sectional view taken in an A6-A6' direction of FIG. 22.

FIG. 22 is a schematic structural diagram of still another curved surface backlight module in accordance with an embodiment of the present application. FIG. 23 is a cross-sectional view taken in an A6-A6' direction of FIG. 22. The initial lamp panel 20 and the initial back panel 10 shown in FIG. 21 are curved to form a curved surface backlight module, as shown in FIG. 22. It will be appreciated that, when the initial back panel 10 is curved, a pressure applied to the bonding pads 213 of the light sources 212 gradually increases in a direction from a central region to an edge region of the initial back panel 10, and thus the likelihood of the breakage and pseudo soldering gradually increases. Therefore, a perpendicular distance from the highest convex position of the first convex curved region 112 to the first flat region 111 may gradually increases in the direction from the center of the first surface 11 of the initial back panel 10 to the edge of the first surface 11 of the initial back panel 10, so that the stress degree borne by the light sources at different positions on the finally formed curved surface backlight module are approximately the same; therefore, the probability of the occurrence of the dead lamp is approximately the same at different positions of the curved surface backlight module, thereby avoiding the fact that dead lamp is concentrated in a specific region of the curved surface backlight module.

It should be noted that, according to the above arrangement manner, the perpendicular distance from the highest convex position of the first convex curved region 112 to the first flat region 111 may gradually increases in the direction from the center of the first surface 11 of the initial back panel 10 to the edge of the first surface 11 of the initial back panel 10, which can not only partly avoid dead lamp and short-circuiting of the light sources 212 of the curved surface backlight module, but also significantly avoid concentration of the dead lamp in the specific region of the curved surface backlight module.

In an embodiment, the multiple first flat regions are arranged in a first direction and extend in a second direction, and the light sources on the multiple first flat regions are arranged in a column in the second direction, and the first direction and the second direction intersect with each other, as shown in FIG. 8 or FIG. 21. The advantage of this arrangement is that, since one first convex curved region and one first concave curved region are arranged between every two adjacent light sources in the first direction, and any two adjacent light sources on the curved surface backlight module in the first direction may be prevented from being short-circuited.

In an embodiment, with continued reference to FIGS. 2 and 3, a boundary of each of the multiple first convex curved regions is parallel to a contour line of respective one of the multiple first concave curved regions. The advantage of this arrangement is that a process of forming the initial back panel is relatively simple. For example, the initial back panel may be formed by curving multiple regions of the prototype back panel having the flat surface. Moreover, when the initial back panel is curved, the multiple first convex curved regions and the multiple first concave curved regions are easier to be stretched, and a phenomenon of dead lamp and short-circuiting of the light sources of the curved surface backlight module formed subsequently is avoided.

In an embodiment, a longitudinal cross-section of each of the multiple first convex curved regions has at least one of following shapes: an arc surface (as shown in FIG. 5, FIG. 12 or FIG. 18), an inverted V-shaped surface or an inverted U-shaped surface in a direction perpendicular to a plane where the first flat region is located.

It should be noted that, in order to clearly show differences between multiple components of the curved surface backlight module in this embodiment and multiple components of the curved surface backlight module in the background technology, multiple components having the same name between the curved surface backlight module in this embodiment and the curved surface backlight module in the background technology adopt different reference signs.

Based on the same inventive concept as the above inventive concept, an embodiment of the present application further provides a curved surface backlight module. The curved surface backlight module includes a back panel and a lamp panel. The back panel is formed by curving an initial back panel, and the lamp panel is formed by curving an initial lamp panel. As shown in FIG. 5, the initial back panel 10 includes the first surface 11 and the second surface 12 which are opposite to each other. The first surface 11 includes the multiple first flat regions 111 and the multiple first convex curved regions 112, and each of the multiple first convex curved regions 112 is located between the adjacent first flat regions 111. The second surface 12 includes the multiple second flat regions 121 and the multiple first concave curved regions 122, and each of the multiple first concave curved regions 122 is located between the adjacent second flat regions 121. The multiple first flat regions 111 and the multiple second flat regions 121 are arranged directly opposite to each other in one-to-one correspondence; the multiple first convex curved regions 112 and the multiple first concave curved regions 122 are arranged directly opposite to each other in one-to-one correspondence, the multiple first convex curved regions 112 are convex away from the first concave curved region 122, and the multiple first concave curved regions 122 are concave toward the multiple first convex curved regions 112. As shown in FIG. 7, the multiple light sources 212 on the initial lamp panel 20 are welded on the front surface 21 of the initial lamp panel 20 through the bonding pads 213. The back surface 22 of the initial lamp panel 20 is laid on the first surface 11 of the initial back panel 10, the multiple light sources 212 are located in the multiple first flat regions 112, and the back surface 22 of the initial lamp panel 20 is convex away from the front surface 21, as shown in FIG. 8. The initial back panel 10 and the initial lamp panel 20 are curved to form the curved surface backlight module. As shown in FIG. 9, the curving axis of the curved surface backlight module is parallel to the curving axes of the multiple first convex curved regions 112 and the curving axes of the multiple first concave curved regions 122.

In an embodiment, with continued reference to FIGS. 8 to 10, the back panel 30 includes the third surface 31 and the fourth surface 32 which are opposite to each other. The third surface 31 includes the multiple first arc regions 311 and the multiple second convex curved region 312, each of the multiple second convex curved regions 312 is located between the adjacent first arc regions 311; the fourth surface 32 includes the multiple second arc regions 321 and the multiple second concave curved regions 322, each of the multiple second concave curved regions 322 is located between the adjacent second arc regions 321, the multiple first arc regions 311 are formed by curving the multiple first flat regions 111, and the multiple second convex curved regions 312 are formed by stretching the multiple first convex curved regions 112. The multiple second arc regions 321 are formed by curving the multiple second flat regions 121, and the multiple second concave curved regions 322 are formed by stretching the multiple first concave curved regions 122.

In an embodiment, as shown in FIG. 5, FIG. 13 or FIG. 19, a boundary of each of the multiple first convex curved regions 111 is parallel to a contour line of a respective one of the multiple first concave curved regions 112.

In an embodiment, as shown in FIG. 12, the initial back panel includes the central region 13 and the edge regions 14 located on two sides of the central region 13, and the multiple first convex curved regions 112 and the multiple first concave curved regions 122 are located in the edge regions.

In an embodiment, as shown in FIG. 18, the perpendicular distance from the highest convex position of the first convex curved region 112 to the first flat region 111 gradually increases in the direction of from the center of the first face 11 of the initial back panel 10 to the edge of the first face 11 of the initial back panel 10.

In an embodiment, a longitudinal cross-section of the multiple first convex curved regions has at least one of following shapes: an arc surface (as shown in FIG. 5, FIG. 12 or FIG. 18), an inverted V-shaped surface or an inverted U-shaped surface in a direction perpendicular to the plane in which the first flat region is located.

The curved surface backlight module proposed by the embodiments of the present application and the method for preparing the curved surface backlight module proposed by the above embodiments belong to the same application concept. Technical details which are not described in detail in this embodiment may refer to the above embodiments, and this embodiment has the same beneficial effect as those obtained by the method for preparing the curved surface backlight module.

Based on the same inventive concept as the above inventive concept, an embodiment of the present application further provides a curved surface backlight module, referring to FIGS. 9, 10, 16, 17, 22 and 23. The curved surface backlight module includes the back panel 30 and the lamp panel 40, the back panel 30 includes the third surface 31 and the fourth surface 32 which are opposite to each other. The third surface 31 includes the multiple first arc regions 311 and the multiple second convex curved regions 312. Each of the multiple second convex curved regions 312 is located between the adjacent first arc regions 311. The fourth surface 32 includes the multiple second arc regions 321 and the multiple second concave curved regions 322, and each of the multiple second concave curved regions 322 is located between the adjacent second arc regions 321. The multiple first arc regions 311 and the multiple second arc regions 321 are arranged directly opposite to each other in one-to-one correspondence, the multiple second convex curved regions 312 and the multiple second concave curved regions 322 are arranged directly opposite to each other in one-to-one correspondence, and the multiple second convex curved regions 312 are convex away from the multiple second concave curved regions 322, the multiple second concave curved regions 322 are concave toward the multiple second convex curved regions 312. The back surface of the lamp panel 40 is attached to the third surface 31 of the back panel. Multiple light sources 212 on the lamp panel 40 are welded to the front surface of the lamp panel 40 through bonding pads. The back surface of the lamp panel 40 faces away from the front surface, and the multiple light sources are located in the multiple first arc regions 311, a curving axis of the curved surface backlight module is parallel to curving axes of the multiple second convex curved regions 312 and curving axes of the multiple second concave curved regions 322.

In an embodiment, as shown in FIGS. 16 and 17, the back panel 30 includes a first central region 33 and first edge regions 34 located on two sides of the first central region 33, where the multiple second convex curved regions 312 and the multiple second concave curved regions 322 are located in the edge regions.

In an embodiment, as shown in FIG. 22, a perpendicular distance from a plane in which the highest convex position of the second convex curved region 312 is located to a plane in which the lowest convex position of the second convex curved region 312 is located gradually increases in a direction from a center of the third surface 31 of the back panel 30 to an edge of the third surface 31 of the back panel 30.

Figure 24:
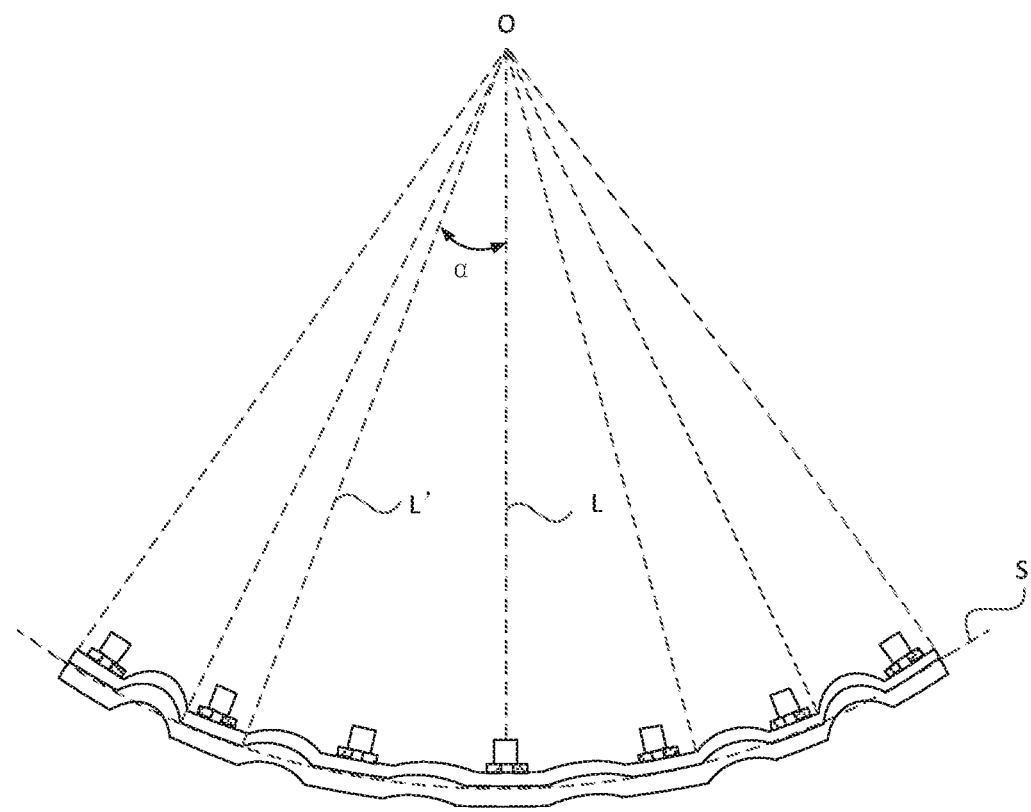
FIG. 24 is a schematic structural diagram of yet another curved surface backlight module in accordance with an embodiment of the present application.

Exemplarily, FIG. 24 is a schematic structural diagram of yet another curved surface backlight module in accordance with an embodiment of the present application. The same structure of the curved surface backlight module as that of the curved surface backlight module shown in the FIG. 22 will not be detailed herein again. Referring to FIG. 24, a boundary contour line of the curved surface backlight module is a quasi-arc curve, and a part, corresponding to the multiple first arc regions, of the quasi-arc curve is located on a same arc curved surface S, and the arc curved surface S has a symmetric line L and a circle center O. A connecting line of a point on the quasi-arc curve and a circle center O is a reference line L', and an included angle between the reference line L' and the symmetric line L is $\alpha$. The points corresponding to the reference line L' for determining $0°<\alpha<5°$ is are first type points, a curve formed by the first type points is a boundary contour line of a first region of the curved surface backlight module, and a range of a curvature radius of a second convex curved region located in the first region is 450 mm to 700 mm. The points corresponding to the reference line L' for determining $5°<\alpha<10°$ are second type points, a curve formed by the second type points is a boundary contour line of a second region of the curved surface backlight module, and a range of a curvature radius of a second convex curved region located in the second region is 200 mm to 450 mm. The points corresponding to the reference lines for determining $10°<\alpha<15°$ are third type points, a curve formed by the third type points is a boundary contour line of a third region of the curved surface backlight module, and a range of a curvature radius of a second convex curved region located in the third region is 100 mm to 200 mm.

Based on the same inventive concept, an embodiment of the present application further provides a display device. The display device includes the curved surface backlight module described in any one of the embodiments of the present application. The display device provided by the embodiments of the present application has beneficial effects corresponding to the curved surface backlight module provided by the embodiments of the present application, which will not to be detailed herein again.

Exemplarily, the display device may be an electronic display apparatus such as an in-vehicle display screen, a mobile phone, a computer, or a television. When the display device is used as the in-vehicle display screen, the display device may be applied to vehicles such as an automobile, a ship, or an airplane. Taking the application in the automobile as an example, the display device may be independent of an inherent structure in the automobile, or may be integrally arranged on other structures in the automobile, such as a front windshield or a table board at a periphery of a dashboard.

What is claimed is:

1. A curved surface backlight module, comprising:
   a back panel and a lamp panel,
   wherein the back panel is formed by curving an initial back panel, and the initial back panel comprises a first surface and a second surface which are opposite to each other, the first surface comprises a plurality of first flat regions and a plurality of first convex curved regions, each of the plurality of first convex curved regions is located between adjacent first flat regions, the second surface comprises a plurality of second flat regions and a plurality of first concave curved regions, each of the plurality of first concave curved regions is located between adjacent second flat regions,
   wherein the plurality of first flat regions and the plurality of second flat regions are arranged directly opposite to each other in one-to-one correspondence, the plurality of first convex curved regions and the plurality of first concave curved regions are arranged directly opposite to each other in one-to-one correspondence, the plurality of first convex curved regions are convex away from the plurality of first concave curved regions, and the plurality of first concave curved regions are concave toward the plurality of first convex curved regions,
   wherein the lamp panel is formed by curving an initial lamp panel, and the initial lamp panel is provided with a plurality of light sources welded on a front surface of the initial lamp panel through bonding pads, and
   wherein a back surface of the initial lamp panel is laid on the first surface of the initial back panel, the back surface of the initial lamp panel faces away from the front surface, the plurality of light sources are located at positions of the initial lamp panel corresponding to the plurality of first flat regions, and a curving axis of the curved surface backlight module is parallel to curving axes of the plurality of first convex curved regions and curving axes of the plurality of first concave curved regions.

2. The curved surface backlight module of claim 1, wherein the back panel comprises a third surface and a fourth surface which are opposite to each other, the third surface comprises a plurality of first arc regions and a plurality of second convex curved regions, each of the plurality of second convex curved regions is located between adjacent first arc regions, the fourth surface comprises a plurality of second arc regions and a plurality of second concave curved regions, each of the plurality of second concave curved regions is located between adjacent second arc regions, wherein the plurality of first arc regions are formed by curving the plurality of first flat regions, the plurality of second convex curved regions are formed by stretching the plurality of first convex curved regions, the plurality of second arc regions are formed by curving the plurality of second flat regions, and the plurality of second concave curved regions are formed by stretching the plurality of first concave curved regions.

3. The curved surface backlight module of claim 1, wherein a boundary contour line of each of the plurality of first convex curved regions is parallel to a boundary contour line of respective one of the plurality of first concave curved regions.

4. The curved surface backlight module of claim 3, wherein a perpendicular distance between a highest convex position of the first convex curved region and the first flat region is gradually increased in a direction from a center of the first surface of the initial back panel to an edge of the first surface of the initial back panel.

5. The curved surface backlight module of claim 1, wherein the initial back panel comprises a central region and edge regions located on two sides of the central region, and the plurality of first convex curved regions and the plurality of first concave curved regions are located in the edge regions.

6. The curved surface backlight module of claim 1, wherein a longitudinal cross-section of the plurality of first convex curved regions has at least one of following shapes: an arc surface, an inverted V-shaped surface or an inverted U-shaped surface in a direction perpendicular to a plane where the first flat region is located.

7. A display device, comprising the curved surface backlight module of claim 1.

8. A curved surface backlight module, comprising: a back panel and a lamp panel, wherein the back panel comprises a third surface and a fourth surface which are opposite to each other, the third surface comprises a plurality of first arc regions and a plurality of second convex curved regions, each of the plurality of second convex curved regions is located between adjacent first arc regions, the fourth surface comprises a plurality of second arc regions and a plurality of second concave curved regions, each of the plurality of second concave curved regions is located between adjacent second arc regions, wherein the plurality of first arc regions and the plurality of second arc regions are arranged directly opposite to each other in one-to-one correspondence, the plurality of second convex curved regions and the plurality of second concave curved regions are arranged directly opposite to each other in one-to-one correspondence, the plurality of second convex curved regions are convex away from the plurality of second concave curved regions, and the plurality of second concave curved regions are concave toward the plurality of second convex curved regions, wherein a back surface of the lamp panel is attached to the third surface of the back panel, the lamp panel is provided with a plurality of light sources welded on a front surface of the lamp panel through bonding pads, the back surface of the lamp panel faces away from the front surface, the plurality of light sources are located at positions of the initial lamp panel corresponding to the plurality of first arc regions, and wherein a curving axis of the curved surface backlight module is parallel to curving axes of the plurality of second convex curved regions and curving axes of the plurality of second concave curved regions.

9. A display device, comprising the curved surface backlight module of claim 8.

10. A method for preparing a curved surface backlight module, comprising:

providing an initial back panel, wherein the initial back panel comprises a first surface and a second surface which are opposite to each other, the first surface comprises a plurality of first flat regions and a plurality of first convex curved regions, each of the plurality of first convex curved regions is located between adjacent first flat regions, the second surface comprises a plurality of second flat regions and a plurality of first concave curved regions, each of the plurality of first concave curved regions is located between adjacent second flat regions, the plurality of first flat regions and the plurality of second flat regions are arranged directly opposite to each other in one-to-one correspondence, the plurality of first convex curved regions and the plurality of first concave curved regions are arranged directly opposite to each other in one-to-one correspondence, the plurality of first convex curved regions is convex away from the plurality of first concave curved regions, and the plurality of first concave curved regions is concave toward the plurality of first convex curved regions;

providing an initial lamp panel, wherein a front surface of the initial lamp panel is provided with a plurality of light sources welded on the initial lamp panel through bonding pads;

laying a back surface of the initial lamp panel on the first surface of the initial back panel, wherein the back surface of the initial lamp panel faces away from the front surface, and the plurality of light sources are located at positions of the initial lamp panel corresponding to the plurality of first flat regions; and curving the initial back panel and the initial lamp panel to form the curved surface backlight module, wherein a curving axis of the curved surface backlight module is parallel to curving axes of the plurality of first convex curved regions and curving axes of the plurality of first concave curved regions.

11. The method for preparing the curved surface backlight module of claim 10, wherein curving the initial back panel and the initial lamp panel to form the curved surface backlight module comprises:

curving the initial back panel to form a back panel, and curving the initial lamp panel to form a lamp panel;

wherein the back panel comprises a third surface and a fourth surface which are opposite to each other, the third surface comprises a plurality of first arc regions and a plurality of second convex curved regions, each of the plurality of second convex curved regions is located between adjacent first arc regions, the fourth surface comprises a plurality of second arc regions and a plurality of second concave curved regions, each of the plurality of second concave curved regions is located between adjacent second arc regions, and wherein the plurality of first arc regions is formed by curving the plurality of first flat regions, the plurality of second convex curved regions is formed by stretching the plurality of first convex curved regions, the plurality of second arc regions is formed by curving the plurality of second flat regions, and the plurality of second concave curved regions is formed by stretching the plurality of first concave curved regions.

12. The method for preparing the curved surface backlight module of claim 10, wherein a boundary contour line of each of the plurality of first convex curved regions is parallel to a boundary contour line of respective one of the plurality of first concave curved regions.

13. The method for preparing the curved surface backlight module of claim 12, wherein a perpendicular distance between a highest convex position of the first convex curved region and the first flat region is gradually increased in a direction from a center of the first surface of the initial back panel to an edge of the first surface of the initial back panel.

14. The method for preparing the curved surface backlight module of claim 10, wherein the initial back panel comprises a central region and edge regions located on two sides of the central region, and the plurality of first convex curved regions and the plurality of first concave curved regions are located in the edge regions.

15. The method for preparing the curved surface backlight module of claim 10, wherein a longitudinal cross-section of the plurality of first convex curved regions has at least one of following shapes: an arc surface, an inverted V-shaped surface or an inverted U-shaped surface in a direction perpendicular to a plane where the first flat region is located.

\* \* \* \* \*